(12) United States Patent
Rodney

(10) Patent No.: US 7,866,404 B2
(45) Date of Patent: Jan. 11, 2011

(54) TUBULAR MEMBER CONNECTION

(75) Inventor: Paul F. Rodney, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 118 days.

(21) Appl. No.: 12/065,813

(22) PCT Filed: Jul. 6, 2006

(86) PCT No.: PCT/US2006/026131

§ 371 (c)(1),
(2), (4) Date: Aug. 29, 2008

(87) PCT Pub. No.: WO2008/005013

PCT Pub. Date: Jan. 10, 2008

(65) Prior Publication Data

US 2008/0314642 A1    Dec. 25, 2008

(51) Int. Cl.
E21B 19/16 (2006.01)
E21B 17/02 (2006.01)
H01R 4/60 (2006.01)
G01V 3/00 (2006.01)

(52) U.S. Cl. ............... 166/380; 166/66; 166/242.6; 340/855.1; 439/194

(58) Field of Classification Search ............ 166/66, 166/242.6, 380; 340/854.6, 854.8, 854.9, 340/855.1; 439/191, 194, 195
See application file for complete search history.

(56) References Cited

U.S. PATENT DOCUMENTS 3,518,608 A * 6/1970 Papadopoulos ........... 439/191
4,496,203 A    1/1985 Meadows 4,557,538 A   12/1985 Chevalier (Continued)

FOREIGN PATENT DOCUMENTS

EP         681353 A1    5/1995

(Continued)

OTHER PUBLICATIONS

"International Application No. PCT/US2006/026131, International Search Report mailed Mar. 28, 2007", 4 pgs.

(Continued)

Primary Examiner—Jennifer H Gay
(74) Attorney, Agent, or Firm—Schwegman, Lundberg & Woessner, P.A.

(57) ABSTRACT

An apparatus and a system, as well as a method and an article, may operate to couple, in a substantially fluid-tight manner, a first tubular member (140') carrying a first set of tubular member conductors (124') to a hollow cylinder (104). The hollow cylinder may include two or more sets of insulators having an equal number of insulating elements (120, 12S) located on the outer surface of the hollow cylinder, and two or more sets of conductors (110, 116) having an equal number of conducting elements defining pairs of conducting elements located on the outer surface. Each of the pairs of conducting elements may be insulated from the other pairs of conducting elements by the sets of insulators. The apparatus and system, as well as the method and article, may also operate to couple, in a substantially fluid-tight manner, a second tubular member (140") carrying a second set of tubular member conductors to the hollow cylinder.

24 Claims, 4 Drawing Sheets

U.S. PATENT DOCUMENTS

| | | | |
|---|---|---|---|
| 4,785,247 | A | 11/1988 | Meador et al. |
| 4,953,636 | A * | 9/1990 | Mohn .................. 166/65.1 |
| 5,007,852 | A * | 4/1991 | Dean et al. ............. 439/201 |
| 5,334,801 | A * | 8/1994 | Mohn .................... 174/47 |
| 5,573,225 | A | 11/1996 | Boyle et al. |
| 5,699,996 | A | 12/1997 | Boyle et al. |
| 6,123,561 | A | 9/2000 | Turner et al. |
| 6,199,633 | B1 | 3/2001 | Longbottom |
| 6,392,317 | B1 | 5/2002 | Hall et al. |
| 6,516,880 | B1 | 2/2003 | Otten et al. |
| 6,641,434 | B2 | 11/2003 | Boyle et al. |
| 6,670,880 | B1 | 12/2003 | Hall et al. |
| 6,688,396 | B2 | 2/2004 | Floerke et al. |
| 6,776,636 | B1 | 8/2004 | Cameron et al. |
| 6,799,632 | B2 | 10/2004 | Hall et al. |
| 6,821,147 | B1 | 11/2004 | Hall et al. |
| 6,866,306 | B2 | 3/2005 | Boyle et al. |
| 6,888,473 | B1 | 5/2005 | Hall et al. |
| 6,945,802 | B2 | 9/2005 | Hall et al. |
| 6,950,034 | B2 | 9/2005 | Pacault et al. |
| 7,156,676 | B2 * | 1/2007 | Reynolds, Jr. .......... 439/194 |
| 2002/0135179 | A1 | 9/2002 | Boyle et al. |
| 2002/0193004 | A1 | 12/2002 | Boyle et al. |
| 2004/0104047 | A1 * | 6/2004 | Peter ..................... 175/40 |
| 2004/0108108 | A1 | 6/2004 | Bailey et al. |
| 2004/0113808 | A1 | 6/2004 | Hall et al. |
| 2004/0150533 | A1 | 8/2004 | Hall et al. |
| 2004/0217880 | A1 | 11/2004 | Clark et al. |
| 2004/0244964 | A1 | 12/2004 | Hall et al. |
| 2005/0001735 | A1 | 1/2005 | Hall et al. |
| 2005/0001736 | A1 | 1/2005 | Hall et al. |
| 2005/0035874 | A1 | 2/2005 | Hall et al. |
| 2005/0045339 | A1 | 3/2005 | Hall et al. |
| 2005/0046591 | A1 | 3/2005 | Pacault et al. |
| 2005/0067159 | A1 | 3/2005 | Hall et al. |
| 2005/0074998 | A1 | 4/2005 | Hall et al. |
| 2005/0087368 | A1 | 4/2005 | Boyle et al. |
| 2005/0092499 | A1 | 5/2005 | Hall et al. |
| 2005/0095827 | A1 | 5/2005 | Hall et al. |
| 2005/0173128 | A1 | 8/2005 | Hall et al. |
| 2005/0212530 | A1 | 9/2005 | Hall et al. |
| 2007/0167051 | A1 * | 7/2007 | Reynolds, Jr. .......... 439/194 |

FOREIGN PATENT DOCUMENTS

| | | |
|---|---|---|
| EP | 681353 B1 | 7/1999 |
| EP | 1367216 A2 | 12/2003 |
| GB | 2404395 A | 2/2005 |
| GB | 2404401 A | 2/2005 |
| GB | 2405422 A | 3/2005 |
| WO | WO-2008005013 A1 | 1/2008 |

OTHER PUBLICATIONS

"International Application No. PCT/US2006/026131, Written Opinion mailed Mar. 28, 2007", 7 pgs.

"International Application Serial No. PCT/US2006/026131, International Preliminary Report on Patentability mailed Jan. 15, 2009", 9 pgs.

* cited by examiner

TUBULAR MEMBER CONNECTION

TECHNICAL FIELD

Various embodiments described herein relate to the connection of tubular members, including piping, such as wired piping used in petroleum drilling and recovery operations.

BACKGROUND INFORMATION

Various schemes exist for the connection of tubular members, such as pipe sections, including pre-wired sections of drill pipe. Some of these make use of induction, so that telemetry and other signals can be passed between sections via flux linkage. However, this method of signal propagation may suffer from absolute insertion loss (e.g., due to misalignment and gaps between sections), as well as the variability of loss between inductors.

DETAILED DESCRIPTION

In order to provide a more reliable mechanism for conducting electrical current and signals between sections of pipe and other tubular members, many of the embodiments disclosed herein provide direct electrical contact between groups of conductors. For example, conductors in a first tubular member may be coupled to a similar arrangement of conductors in a second tubular member via a cylindrical intermediary, obviating many of the problems associated with inductive coupling.

Figure 1A:
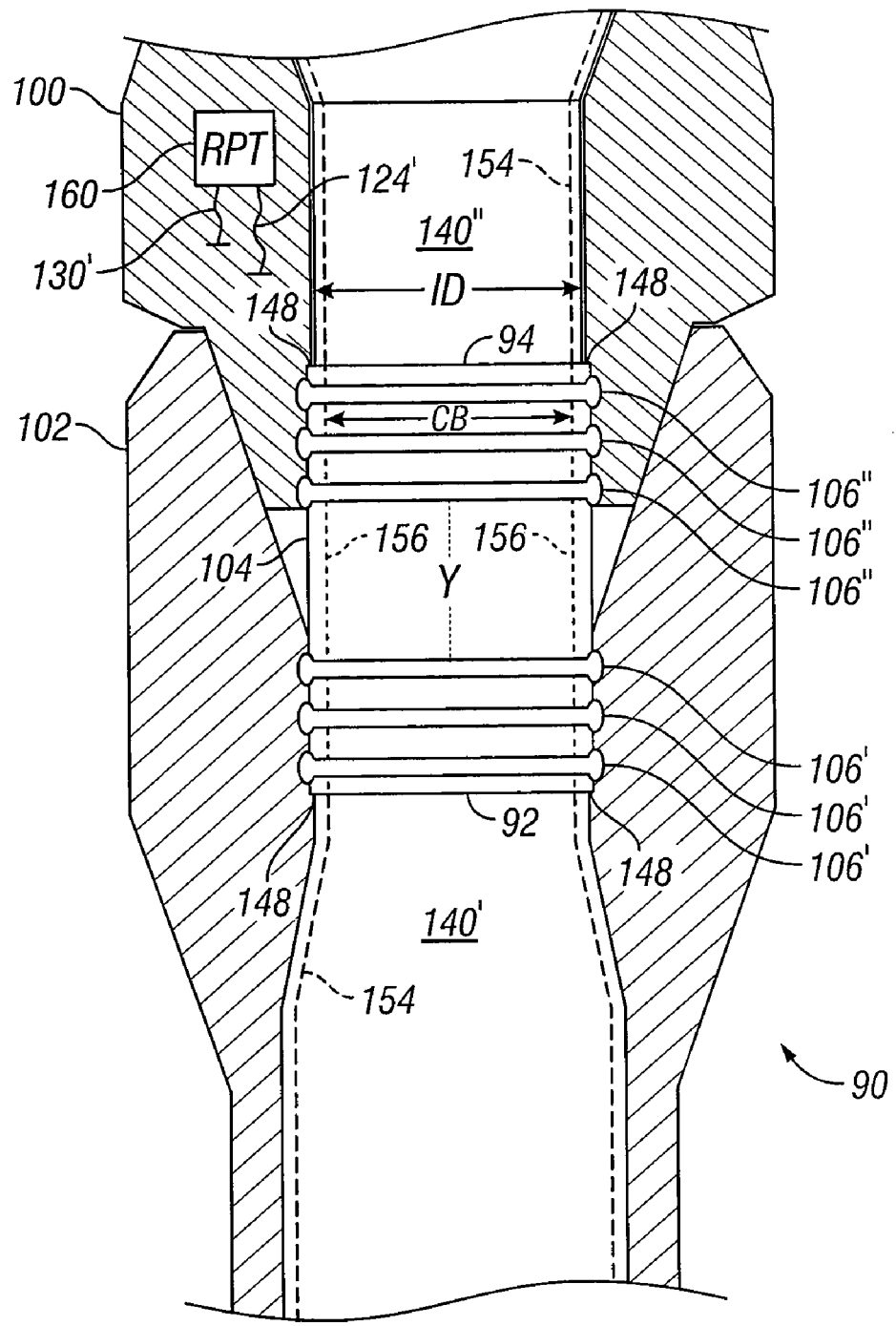
FIGS. 1A and 1B are side, cut-away views of mechanical and electrical coupling apparatus according to various embodiments of the invention.
Figure 1B:
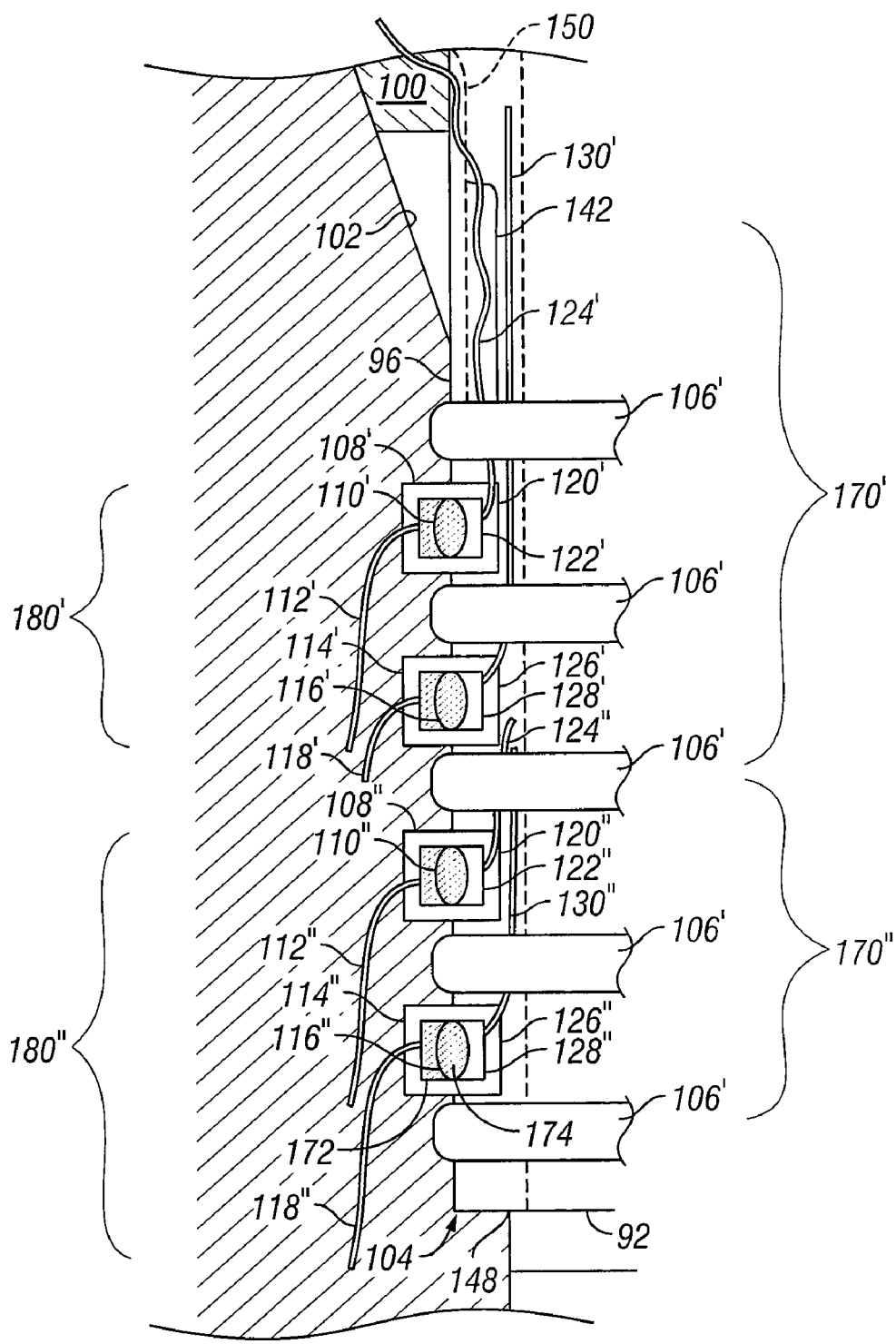

FIGS. 1A and 1B are side, cut-away views of mechanical and electrical coupling apparatus 90 according to various embodiments of the invention. In some embodiments, the apparatus 90 may comprise a cylinder 104, such as a hollow cylinder, having a box-end pressure seal 106' on a first end 92 and a pin-end pressure seal 106" on a second end 94. The pressure seals 106', 106" may comprise o-rings. The cylinder 104 may comprise a substantially non-conducting cylinder (e.g., having a resistivity of greater than $10^7$ ohm-m).

The apparatus 90 may also comprise one or more sets of conductors 170', 170" having several parts (e.g., wires 124', 130" and 124", 130"), including an equal number of conducting elements 122', 128' and 122", 128" defining pairs of conducting elements located on the outer surface 96 of the cylinder 104. Each of the pairs of conducting elements may be insulated from the other pairs of conducting elements by the cylinder 104 (e.g., when the cylinder comprises a substantially non-conducting cylinder).

The apparatus 90 may also comprise one or more tubular members 140', 140", such as drill pipe. Thus, the apparatus 90 may comprise a tubular member 140' having a box end 102, and/or a tubular member 140" having a pin end 100, either one or both of which can mate with the first end 92 or the second end 94 of the cylinder 104. The sets of conductors 170', 170" may be electrically coupled to corresponding sets of conductors 180', 180" (comprising in turn conducting elements 110', 116' and 110", 116" and wires 112', 118' and 112", 118") carried by the tubular members 140', 140" when the tubular members 140', 140" are disposed in a mating position with the cylinder 104 (as shown in FIG. 1A). The tubular members 140', 140" may comprise pre-wired tubular members (e.g., carrying wires 112', 118' and 112", 118").

The cylinder 104, when comprising a substantially non-conducting cylinder, may be formed from an amorphous metal, such as the Liquidmetal® alloys supplied by Liquidmetal® Technologies of Lake Forest, CALIF. For the purposes of this document, an amorphous metal means a metallic material with a disordered, or non-crystalline atomic-scale structure. Amorphous metals may include glass-forming alloys based on zirconium, palladium, iron, titanium, copper, magnesium, and other metals, such as amorphous steel.

In some embodiments, the cylinder 104 comprises a substantially conductive cylinder. In this case, insulators 120', 126' and 120", 126", perhaps comprising insulating rings, may be used to surround grooves or channels in the cylinder 104. The insulators 120', 126' and 120", 126" may contain conducting elements 122', 128' and 122", 128", perhaps comprising inner conducting rings, so as to isolate the conducting elements 122', 128' and 122", 128" from the substantially conducting cylinder 104.

Additional sets of insulators 108', 114' and 108", 114" may be mounted within grooves or channels in the box end 102. The conducting elements 110', 116' and 110", 116" may be mounted on the inside diameter of the insulators 108', 114' and 108", 114" and may be fabricated in the form of a ring. The conducting elements 110', 116' and 110", 116" may comprise a spring material, such a beryllium copper, and may be designed to exert a force against the conducting elements 122', 128' and 122", 128", bringing these sets of conducting elements into electrical contact with each other. In this manner, wires 124', 130' and 124", 130" may be electrically coupled directly to wires 112', 118' and 112''', 118".

The hermaphroditic structure shown at the box end 102 can mate with a pin end 100 that operates as a male connector from the standpoint of transmitting torque, and a female connector from the standpoint of making electrical contact. In many embodiments, the conductive elements (e.g., conducting elements 110', 116' and 110", 116"; and 122', 128' and 122", 128") may be constructed so as to reside completely within the box 102 and/or pin 100, without protruding therefrom. Thus, either or both the first end 92 and the second end 94 of the cylinder 104 may be completely covered by the box end 102 and the pin end 100, respectively, when the tubular members 140', 140" are disposed in a mating position with the cylinder 104.

Wires 124', 130' and 124", 130" may pass through bores or channels 142 in the cylinder 104, perhaps parallel to the cylindrical axis of symmetry Y. While not explicitly shown in the figures, it should be noted that the second end 94 of the cylinder 104 includes conductors, conducting elements, wires, and perhaps insulators, corresponding to those used at the first end 92. Similarly, the pin end 100 and/or tubular member 140" may carry conductors (not shown) corresponding to conductors 180', 180" that are carried in the box end 102 (as shown in FIG. 1B) and/or tubular member 140'. The conducting elements 110', 116' and 110", 116" and 122', 128' and 122", 128" may be formed as described, or as assemblies of several smaller elements (e.g., the conducting elements 110', 116' and 110", 116" may be formed as two separate elements: a grooved ring 172 supporting a circular spring 174 as shown in FIG. 1B).

In some embodiments, the cylinder 104 may be connected to the box end 102 on a semi-permanent basis, and constructed in a manner that prevents protrusion beyond the box end 102. By forming and using the cylinder 104 in this manner, it should be possible for drilling crews to routinely handle tubular members 140', 140" taking the form of pipe without special precautions to ensure that electrical contact is made between the sections of pipe that are coupled together.

The box end 102 and the pin end 100 of the tubular members 140', 140" may be designed to include shoulders 148 to support the cylinder 104. In some embodiments, the diameter of the central bore CB of the cylinder 104 substantially matches the inner-diameter ID of the box end 102 and pin end 100. Therefore, the tubular members 140', 140" may have an inner wall 154 that is substantially in line with an inner wall 156 of the cylinder 104 when the tubular members 140', 140" are disposed in a mating position with the cylinder 104 (shown in FIG. 1B).

Thus, many embodiments may be realized. For example, the apparatus 90 may comprise a cylinder 104 (e.g., a substantially conductive, hollow cylinder) having a box-end pressure seal 106' on a first end 92 and a pin-end pressure seal 106" on a second end 94. The apparatus 90 may further include sets of insulators having an equal number of insulating elements 120', 126" and 120", 126" located on an outer surface 96 of the cylinder 104. The apparatus 90 may also include sets of conductors 170', 170" having an equal number of conducting elements 122', 128' and 122", 128" defining pairs of conducting elements located on the outer surface 96 of the cylinder 104, wherein each of the pairs of conducting elements 122', 128' is insulated from the other pairs of conducting elements 122", 128" by the sets of insulators 120', 126" and 120", 126".

The insulating elements 120', 126" and 120", 126" may comprise insulating rings, and the conducting elements 110', 116' and 110", 116" and 122', 128' and 122", 128" may comprise conducting rings. The conductors 170', 170" and 180', 180" may comprise wires, or be coupled to wires. Thus, in some embodiments, sets of conductors 170', 170" may be coupled to corresponding sets of conductors 180', 180" carried by the tubular members 140', 140" (and/or box end 102 or pin end 100) when the tubular members 140', 140" are disposed in a mating position with the cylinder 104. Each one of the conductive elements 110', 116', 110", 116", 122', 128', 122", 128" having membership in the sets of conductors may be partially surrounded by one or more of the insulating elements 108', 114', 180", 114", 120', 126', 120", 126" having a membership in the sets of insulators. In some embodiments, the body of the cylinder 104 may comprise one or more open channels 150 or closed passages 142 to house wires 124', 130', 124", 130" coupled to the conducting elements 122', 128', 122", 128". The apparatus 90 may include one or more repeaters 160 to couple to one or more pairs of conducting elements 122', 128', 122", 128" and/or wires 124', 130' and 124", 130".

Figure 2:
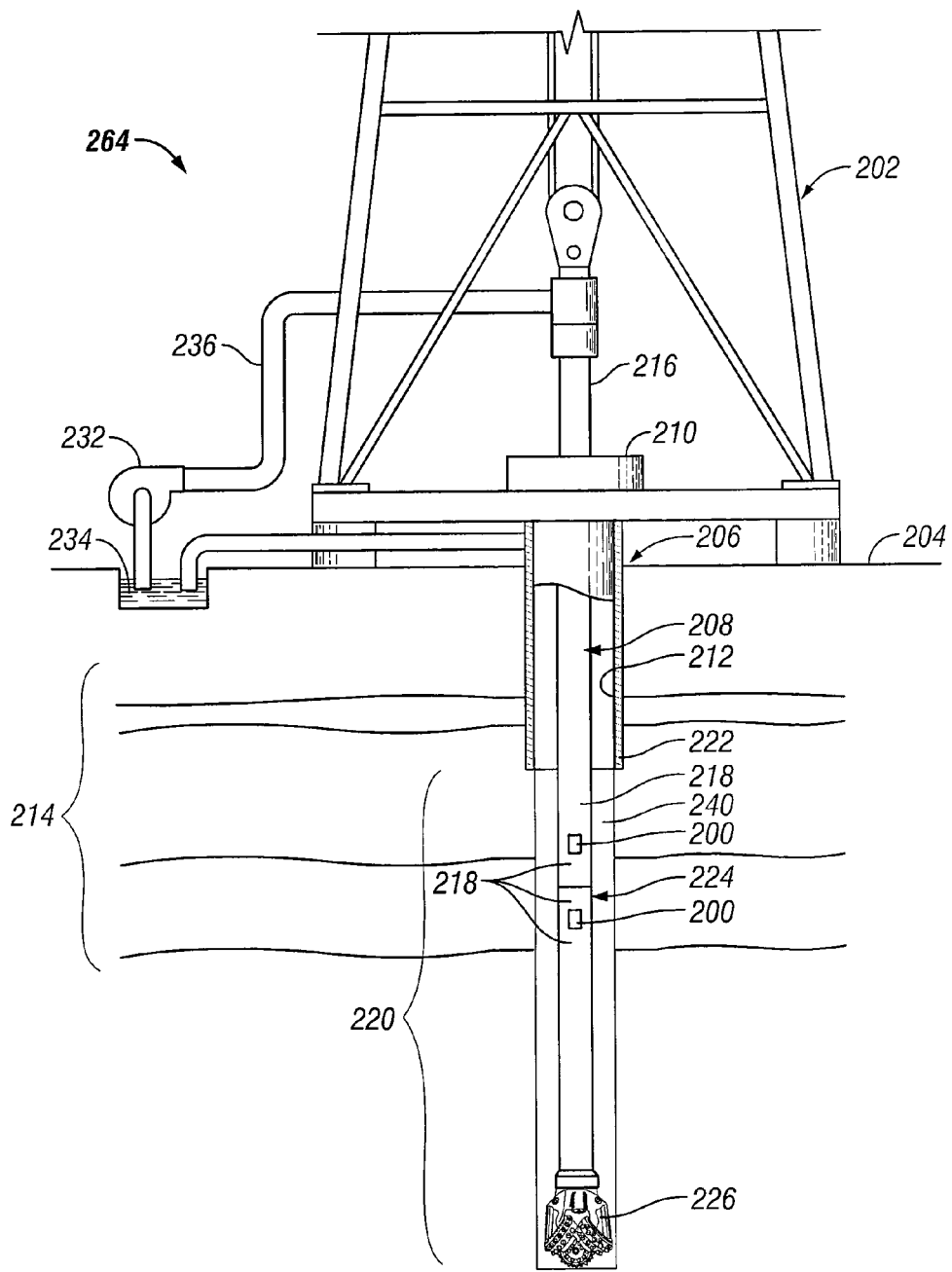
FIG. 2 illustrates apparatus and systems according to various embodiments of the invention.

FIG. 2 illustrates apparatus 200 and systems 264 according to various embodiments of the invention. The apparatus 200, which may be similar to or identical to the apparatus 90 described above and shown in FIGS. 1A-1B, may comprise portions of a downhole tool 224 as part of a downhole drilling operation.

For example, it can be seen how a system 264 may form a portion of a drilling rig 202 located at a surface 204 of a well 206. The drilling rig 202 may provide support for a drill string 208. The drill string 208 may operate to penetrate a rotary table 210 for drilling a borehole 212 through subsurface formations 214. The drill string 208 may include a Kelly 216, drill pipe 218, and a bottom hole assembly 220, perhaps located at the lower portion of the drill pipe 218. The drill string 208 may include wired and unwired drill pipe, as well as wired and unwired coiled tubing, including segmented drilling pipe, casing, and coiled tubing.

The bottom hole assembly 220 may include drill collars 222, a downhole tool 224, and a drill bit 226. The drill bit 226 may operate to create a borehole 212 by penetrating the surface 204 and subsurface formations 214. The downhole tool 224 may comprise any of a number of different types of tools including measurement while drilling (MWD) tools, logging while drilling (LWD) tools, and others.

During drilling operations, the drill string 208 (perhaps including the Kelly 216, the drill pipe 218, and the bottom hole assembly 220) may be rotated by the rotary table 210. In addition to, or alternatively, the bottom hole assembly 220 may also be rotated by a motor (e.g., a mud motor) that is located downhole. The drill collars 222 may be used to add weight to the drill bit 226. The drill collars 222 also may stiffen the bottom hole assembly 220 to allow the bottom hole assembly 220 to transfer the added weight to the drill bit 226, and in turn, assist the drill bit 226 in penetrating the surface 204 and subsurface formations 214.

During drilling operations, a mud pump 232 may pump drilling fluid (sometimes known by those of skill in the art as "drilling mud") from a mud pit 234 through a hose 236 into the drill pipe 218 and down to the drill bit 226. The drilling fluid can flow out from the drill bit 226 and be returned to the surface 204 through an annular area 240 between the drill pipe 218 and the sides of the borehole 212. The drilling fluid may then be returned to the mud pit 234, where such fluid is filtered. In some embodiments, the drilling fluid can be used to cool the drill bit 226, as well as to provide lubrication for the drill bit 226 during drilling operations. Additionally, the drilling fluid may be used to remove subsurface formation 214 cuttings created by operating the drill bit 226.

Thus, referring now to FIGS. 1A-1B and 2, it may be seen that in some embodiments, the system 264 may include a drill collar 222, and/or a downhole tool 224, to which one or more apparatus 200 are attached. The downhole tool 224 may comprise an LWD tool or MWD tool. A drill string 208 may be mechanically coupled to the downhole tool 224.

In some embodiments then, a system 264, such as a tubular member coupling system, may include a downhole tool 224 to couple to one or more tubular members (e.g. drill pipe sections 218 may include one or more tubular members) having pin ends 100, box ends 102, or a combination of both, to couple in turn to one or more apparatus 90 in a substantially fluid-tight relationship.

The apparatus 90, 200; first end 92; second end 94; outer surface 96; pin end 100; box end 102; cylinder 104; pressure seals 106; insulators 108, 114, 120, 126; conducting elements 110, 116, 122, 128; wires 112, 118, 124, 130; tubular members 140; channels 142; shoulders 148; channels 150; inner walls 154, 156; repeaters 160; conductors 170, 180; ring 172; spring 174; drilling rig 202; surface 204; well 206; drill string 208; rotary table 210; borehole 212; formations 214; Kelly 216; drill pipe 218; bottom hole assembly 220; drill collars 222; downhole tool 224; drill bit 226; mud pump 232; mud pit 234; hose 236; annular area 240; and systems 264 may all be characterized as "modules" herein. Such modules may include hardware circuitry, and/or a processor and/or memory circuits, software program modules and objects, and/or firmware, and combinations thereof, as desired by the architect of the apparatus 90, 200 and systems 264, and as appropriate for particular implementations of various embodiments. For example, in some embodiments, such modules may be included in an apparatus and/or system operation simulation package, such as a software electrical signal simulation package, an alignment and synchronization simulation package, and/or a combination of software and hardware used to simulate the operation of various potential embodiments.

It should also be understood that the apparatus and systems of various embodiments can be used in applications other than for drilling and logging operations, and thus, various embodiments are not to be so limited. The illustrations of apparatus 90, 200, and systems 264 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules, including multilayer, multi-chip modules. Such apparatus and systems may further be included as sub-components within a variety of electronic systems, such as televisions, personal computers, workstations, vehicles, including aircraft and watercraft, as well as cellular telephones, among others. Some embodiments include a number of methods.

Figure 3:
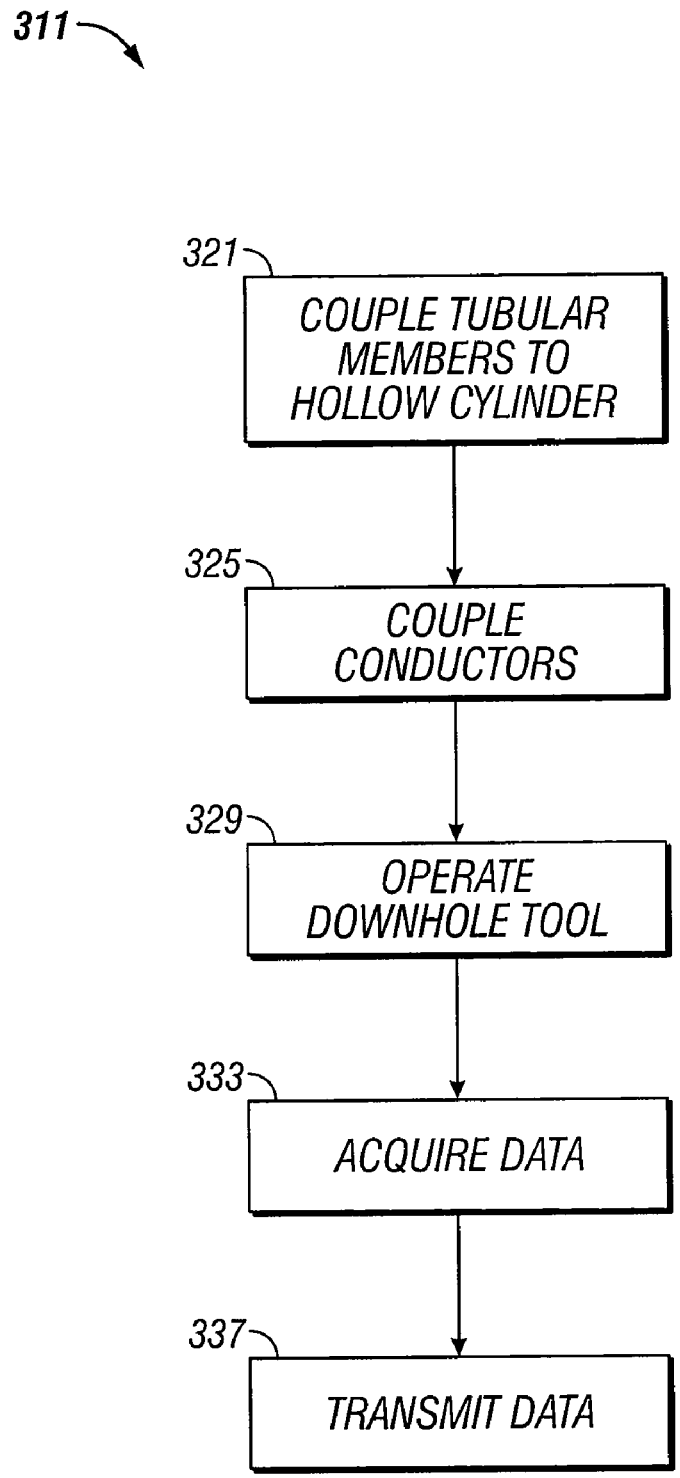
FIG. 3 is a flow chart illustrating several methods according to various embodiments of the invention.

For example, FIG. 3 is a flow chart illustrating several methods 311 according to various embodiments of the invention. In some embodiments, a method 311 may begin at block 321 with coupling, in a substantially fluid-tight manner, a first tubular member carrying a first set of tubular member conductors to a cylinder (e.g., a hollow cylinder) having one or more sets of insulators. The insulators may include an equal number of insulating elements located on an outer surface of the cylinder. The cylinder may also include one or more sets of conductors having equal numbers of conducting elements, perhaps defining pairs of conducting elements, located on the outer surface of the cylinder, and perhaps insulated from each other by the sets of insulators.

In some embodiments, the method 311 may include coupling, in a substantially fluid-tight manner, a second tubular member carrying a second set of tubular member conductors to the cylinder at block 325. The method 311 may also include coupling the first set of tubular member conductors to the second set of tubular member conductors via the sets of conductors included in the cylinder.

In some embodiments, the method 311 may include operating a downhole tool by sending signals to the downhole tool from a surface logging facility via one or more of the sets of conductors included in the cylinder at block 329. The method 311 may also include, at block 333, acquiring logging while drilling data via at one or more of the sets of conductors included in the cylinder, and at block 337, transmitting the logging while drilling data to a repeater attached to the first and/or second tubular member. Of course, numerous tubular members and repeaters may be used to carry signal data to the downhole tool via one or more cylindrical apparatus, as described above.

It should be noted that the methods described herein do not have to be executed in the order described, or in any particular order. Moreover, various activities described with respect to the methods identified herein can be executed in iterative, repetitive, serial, or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment.

Thus, other embodiments may be realized. For example, an article according to various embodiments, such as a computer, a memory system, a magnetic or optical disk, some other storage device, and/or any type of electronic device or system may include a processor coupled to a machine-accessible medium such as a memory (e.g., removable storage media, as well as any memory including an electrical, optical, or electromagnetic conductor) having associated information (e.g., computer program instructions and/or data), which when accessed, results in a machine (e.g., the processor) performing any of the actions described with respect to the method above.

Using the coupling apparatus, systems, and methods disclosed herein may provide less insertion loss and more reliable operation than those that rely on inductive coupling. In addition, the use of cylinders that are protected by the pin and box ends of drill pipe may provide a more robust handling environment when the tubular members are inserted into and removed from boreholes by drilling crews.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

In this description, numerous specific details such as logic implementations, opcodes, means to specify operands, resource partitioning, sharing, and duplication implementations, types and interrelationships of system components, and logic partitioning/integration choices are set forth in order to provide a more thorough understanding of various embodiments. It will be appreciated, however, by those skilled in the art that embodiments of the invention may be practiced without such specific details. In other instances, control structures, gate level circuits and full software instruction sequences have not been shown in detail so as not to obscure the embodiments of the invention.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method of assembling a tubular string, comprising:
    mechanically coupling, with a first pressure seal, a first tubular member to a hollow cylinder, the first tubular member carrying a first set of tubular member conductors, the hollow cylinder having at least two sets of insulators having an equal number of insulating elements located on an outer surface of the hollow cylinder, and at least two sets of conductors having an equal number of conducting elements defining pairs of conducting elements located on the outer surface of the hollow cylinder, wherein each of the pairs of conducting elements is insulated from the other pairs of conducting elements by the at least two sets of insulators; and
    mechanically coupling, with a second pressure seal, a second tubular member to the hollow cylinder, the second tubular member carrying a second set of tubular member conductors, wherein mechanically coupling the first tubular member and the second tubular member to the hollow cylinder results in electrically coupling at least one of the first set of tubular member conductors to at least one of the second set of tubular member conductors via at least one of the at least two sets of conductors.

2. The method of claim 1, further comprising:
    electrically coupling the first set of tubular member conductors to the second set of tubular member conductors via the at least two sets of conductors.

3. The method of claim 1, further comprising:
    acquiring logging while drilling data via at least one of the at least two sets of conductors.

4. The method of claim 3, further comprising:
    transmitting the logging while drilling data to a repeater attached to the first tubular member or the second tubular member.

5. The method of claim 1, further comprising:
    operating a downhole tool by sending signals to the downhole tool from a surface logging facility via at least one of the at least two sets of conductors.

6. An apparatus, comprising:
    a unitary, hollow cylinder having a box-end pressure seal on a first end and a pin-end pressure seal on a second end;
    at least two sets of insulators having an equal number of insulating elements located on an outer surface of the hollow cylinder; and
    at least two sets of conductors having an equal number of conducting elements defining pairs of conducting elements located on the outer surface of the hollow cylinder, wherein each of the pairs of conducting elements is insulated from the other pairs of conducting elements by the at least two sets of insulators.

7. The apparatus of claim 6, wherein the box-end pressure seal and the pin-end pressure seal comprise o-rings.

8. The apparatus of claim 6, wherein the insulating elements comprise insulating rings, and wherein the conducting elements comprise conducting rings.

9. The apparatus of claim 6, wherein the conducting elements are coupled to wires.

10. The apparatus of claim 6, wherein a body of the hollow cylinder comprises:
    at least one of an open channel and a closed passage to house a wire coupled to at least one of the conducting elements.

11. The apparatus of claim 6, wherein the hollow cylinder comprises a substantially conductive hollow cylinder, and wherein each one of the conductive elements having a membership in the at least two sets of conductors is at least partially surrounded by at least one of the insulating elements having a membership in the at least two sets of insulators.

12. The apparatus of claim 6, further comprising:
    a tubular member having at least one of a box end and a pin end to mate with the first end or the second end of the hollow cylinder, respectively, wherein the at least two sets of conductors are coupled to corresponding sets of conductors carried by the tubular member when the tubular member is disposed in a mating position with the hollow cylinder.

13. The apparatus of claim 12, wherein the tubular member comprises a pre-wired section of drill pipe.

14. The apparatus of claim 12, wherein the tubular member has an inner wall that is substantially in line with an inner wall of the hollow cylinder when the tubular member is disposed in the mating position.

15. The apparatus of claim 12, wherein the first end of the hollow cylinder or the second end of the hollow cylinder are completely covered by the box end and the pin end, respectively, when the tubular member is disposed in the mating position.

16. An apparatus for connecting a first and second tubular member, comprising:
    a substantially non-conducting hollow cylinder having a box-end pressure seal on a first end and a pin-end pressure seal on a second end, wherein the first end is in contact with an end of the first tubular member and the second end is in contact with an end of the second tubular member; and
    at least two sets of conductors having an equal number of conducting elements defining pairs of conducting elements located on an outer surface of the hollow cylinder, wherein each of the pairs of conducting elements is insulated from the other pairs of conducting elements by the substantially non-conducting hollow cylinder.

17. The apparatus of claim 16, wherein one of the first tubular member or the second tubular member comprises
    a tubular member having at least one of a box end and a pin end to mate with the first end or the second end of the hollow cylinder, respectively, wherein the at least two sets of conductors are coupled to corresponding sets of conductors carried by the tubular member when the tubular member is disposed in a mating position with the hollow cylinder.

18. The apparatus of claim 17, wherein the first tubular member comprises a pre-wired tubular member.

19. The apparatus of claim 17, wherein the first tubular member comprises a section of drill pipe.

20. The apparatus of claim 16, wherein the substantially non-conducting hollow cylinder comprises an amorphous metal.

21. A system, including:
an apparatus including a unitary, hollow cylinder having a box-end pressure seal on a first end and a pin-end pressure seal on a second end, at least two sets of insulators having an equal number of insulating elements located on an outer surface of the hollow cylinder, and at least two sets of conductors having an equal number of conducting elements defining pairs of conducting elements located on the outer surface of the hollow cylinder, wherein each of the pairs of conducting elements is insulated from the other pairs of conducting elements by the at least two sets of insulators; and
a downhole tool to couple to at least one tubular member having at least one of a pin end and a box end to couple to the apparatus in a substantially fluid-tight relationship.

22. The system of claim 21, wherein the downhole tool includes a logging while drilling (LWD) tool.

23. The system of claim 21, further including:
a plurality of drill pipe sections including the at least one tubular member.

24. The system of claim 21, further including:
a repeater to couple to at least one of the pairs of conducting elements.

* * * * *